US012575586B2

(12) United States Patent
Inoue et al.

(10) Patent No.: US 12,575,586 B2
(45) Date of Patent: Mar. 17, 2026

(54) HYDROUS OILY FOOD

(71) Applicant: MEIJI CO., LTD., Tokyo (JP)

(72) Inventors: Kazuya Inoue, Tokyo (JP); Masamichi Tokunaga, Tokyo (JP); Yuri Nishiyama, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 497 days.

(21) Appl. No.: 18/007,557

(22) PCT Filed: Jun. 3, 2021

(86) PCT No.: PCT/JP2021/021112
§ 371 (c)(1),
(2) Date: Dec. 1, 2022

(87) PCT Pub. No.: WO2021/246468
PCT Pub. Date: Dec. 9, 2021

(65) Prior Publication Data
US 2023/0309576 A1 Oct. 5, 2023

(30) Foreign Application Priority Data

Jun. 3, 2020 (JP) ................................ 2020-096661

(51) Int. Cl.
*A23G 1/32* (2006.01)

(52) U.S. Cl.
CPC ..................................... *A23G 1/32* (2013.01)

(58) Field of Classification Search
None
See application file for complete search history.

(56) References Cited

U.S. PATENT DOCUMENTS 5,232,734 A 8/1993 Takemori et al.
5,958,476 A * 9/1999 Cain ........................ A23G 9/32
426/601

5,965,179 A 10/1999 Ducret et al.
2005/0019476 A1* 1/2005 Van Bodegom .......... A23L 9/24
426/602
2022/0117253 A1 4/2022 Inoue et al.

FOREIGN PATENT DOCUMENTS

| | | |
|---|---|---|
| EP | 0427544 A2 * 5/1991 | ............... A23G 9/42 |
| JP | 64-43150 | 2/1989 |
| JP | 3-228647 | 10/1991 |
| JP | 4-248950 | 9/1992 |
| JP | 5-111350 | 5/1993 |
| JP | 9-135663 | 5/1997 |
| JP | 10-28530 | 2/1998 |
| JP | 2002-209521 | 7/2002 |
| JP | 2003-9770 | 1/2003 |
| JP | 2008-522622 | 7/2008 |
| JP | 2010-88374 | 4/2010 |
| JP | 2015-62397 | 4/2015 |
| JP | 2020-62 | 1/2020 |
| WO | 2006/063130 | 6/2006 |
| WO | 2020/111270 | 6/2020 |

OTHER PUBLICATIONS

Saglio et al., "Understanding the structure of Ganache: Link between composition and textrure" obtained from International Journal of Gastronomy and Food Science-13 (2018) pp. 29-37 (Year: 2018).*
Notice of Reasons for Refusal issued Jan. 16, 2024 in corresponding Japanese Patent Application No. 2022-528883, with English language translation.
International Search Report issued Jul. 20, 2021 in corresponding International (PCT) Patent Application No. PCT/JP2021/021112.
International Preliminary Report on Patentability issued Dec. 6, 2022 in corresponding International (PCT) Patent Application No. PCT/JP2021/021112.

* cited by examiner

*Primary Examiner* — Jyoti Chawla
(74) *Attorney, Agent, or Firm* — Wenderoth, Lind & Ponack, L.L.P.

(57) ABSTRACT

A hydrous oily food having a moisture content of 3% by mass or more and 20% by mass or less, and containing a water-based continuous phase and an oil-based continuous phase.

4 Claims, 11 Drawing Sheets

(a)

(b)

(a)

(b)

HYDROUS OILY FOOD

TECHNICAL FIELD

The invention relates to a hydrous oily food.

Specifically, the invention relates to a hydrous oily food capable of preventing the separation of fat and having good melting in the mouth.

BACKGROUND ART

Patent Documents 1 to 5 disclose hydrous chocolates.

Specifically, Patent Document 1 discloses an emulsified composition wherein a continuous phase being the outer phase is fat, and wherein an oil-in-water emulsified product containing medium chain fatty acid triglyceride is contained as the internal phase thereof.

Patent Document 2 discloses a method for producing a cocoa-based oil-in-water suspension, the method including: providing a fat phase containing cocoa butter; providing an aqueous phase containing water, sugar, or a sweetener, or both sugar and a sweetener, and one or more cocoa products containing cocoa protein, starch, or a cell wall material; mixing the two phases together; and heating the two phases mixed together to form a gel network consisting of cocoa protein and/or cocoa starch components, wherein the viscosity of the suspension increases after the heating.

Patent Document 3 discloses a heat resistant chocolate obtained by dispersing and mixing an O/W emulsion in which fat is dispersed in an aqueous phase in the chocolate.

Patent Document 4 discloses a method for producing a confectionery food using ganache, the method including: adjusting a ganache base prepared by mixing a fat confectionery base, a sugar solution, a dairy product, and the like to 25 to 35° C., allowing air bubbles to be contained therein by an aeration apparatus under cooling, thereby obtaining an aerated ganache base at a temperature of 15 to 25° C. which is 5 to 10° C. lower than the initial temperature with a specific gravity of 1.0 or less, and forming the ganache base.

Patent Document 5 discloses a hydrous chocolate composition obtained by blending microcrystalline cellulose and a cellulose composite consisting of a hydrophilic polymer.

PRIOR ART DOCUMENT

Patent Document

[Patent Document 1] JP-A-2015-62397
[Patent Document 2] JP-A-2008-522822
[Patent Document 3] JP-A-H3-228847
[Patent Document 4] JP-A-H5-111350
[Patent Document 5] JP-A-2003-9770

SUMMARY OF INVENTION

The inventors have found that, in a hydrous oily food having a moisture content of 3% by mass or more and 20% by mass or less, such as a hydrous chocolate, both prevention of the separation of fat and provision of good melting in the mouth are difficult to be achieved.

Conventional techniques including Patent Documents 1 to 5 have been found to have room for further improvement from the viewpoint of solving those problems.

An object of the invention is to provide a hydrous oily food capable of preventing the separation of fat and having good melting in the mouth.

The invention can provide the following hydrous oily foods.

1. A hydrous oily food having a moisture content of 3% by mass or more and 20% by mass or less, and containing a water-based continuous phase and an oil-based continuous phase.
2. The hydrous oily food according to 1, wherein the water-based continuous phase and the oil-based continuous phase are retained even after storage at 23° C. for 1 day from immediately after production.
3. The hydrous oily food according to 1 or 2, wherein the hydrous oily food is a hydrous chocolate.

The invention can provide a hydrous oily food capable of preventing the separation of fat and having good melting in the mouth.

DESCRIPTION OF EMBODIMENTS

Figure 1:
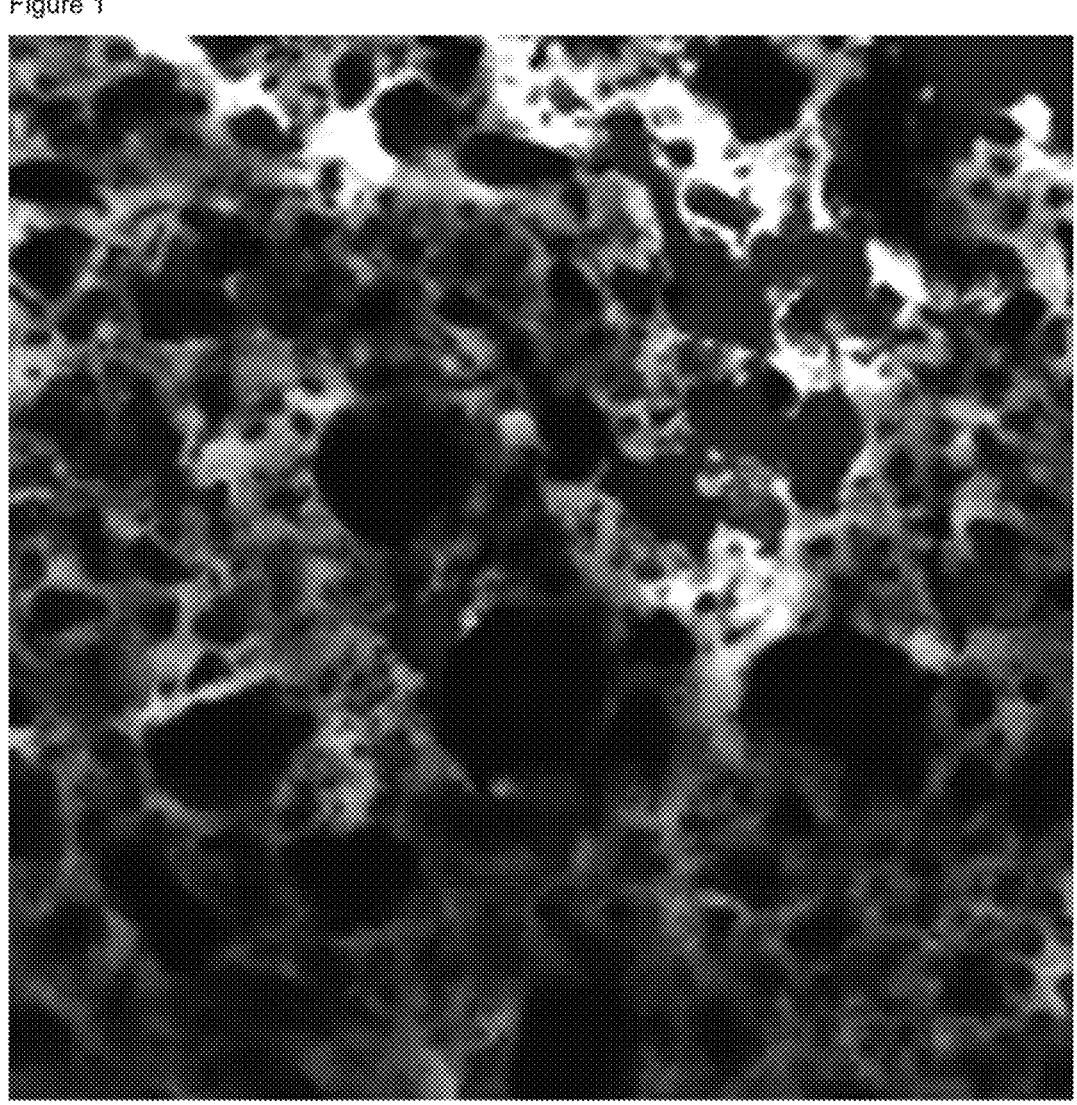
FIG. 1 is a confocal micrograph (×40) of Example 1.

Hereinafter, the hydrous oily food of the invention will be described in detail.

In the present specification. "x to y" is meant to indicate a numerical range of "x or more and Y or less". Upper limit and lower limit values shown in terms of numerical ranges can be arbitrarily combined.

Any mode as a combination of two or more individual modes of the invention described in the following is also a mode of the invention.

1. Hydrous Oily Food

The hydrous oily food according to one aspect of the invention has a moisture content of 3% by mass or more and 20% by mass or less and contains a water-based continuous phase and an oil-based continuous phase.

The hydrous oily food can provide effects of being capable of preventing the separation of fat and having good melting in the mouth.

Typically, in a ganache obtained by adding moisture to chocolate, the emulsion stability thereof largely varies depending on the ratio of the moisture, oil, and other solids to be blended. Especially, in a hydrous chocolate having a moisture content of 3% by mass or more and 20% by mass or less, the emulsion stability is low, and thickening or separation occur, so that it has been extremely difficult to uniformly mix and stably form the hydrous chocolate.

To solve the above problems, there are methods such as adjustment of the fat composition and addition of an emulsifying agent or a gelling agent. However, an emulsified hydrous chocolate becomes a water-in-oil hydrous chocolate in a low moisture range, which is inferior in melting in the mouth as compared with that of an oil-in-water hydrous chocolate. Meanwhile, even in the low moisture range, it is possible to produce a plastic chocolate with suppressed separation by blending a large amount of sugar ingredient and the like having high solubility, but the flavor and quality inherent in the chocolate are hardly obtained.

To retain a stable emulsified state of the hydrous chocolate having a moisture content of 3% by mass or more and 20% by mass or less, it is considered to form the hydrous chocolate after ingredients are mixed to make them in a water-in-oil or oil-in-water emulsified state. However, the water-in-oil hydrous chocolate is inferior in melting in the mouth as compared with that of the oil-in-water one, and the oil-in-water one typically has a short shelf-life and low heat resistance, and thus the distribution and storage conditions thereof are limited.

The inventors have focused on the structure (phase structure) of the moisture and the fat contained in the hydrous oily food such as hydrous chocolate. Although a typical ganache has the water-based continuous phase, fat is dispersed as fat droplets and the typical ganache does not contain the oil-based continuous phase. That is, the typical ganache has a structure mainly composed of the water-based continuous phase. In contrast, the hydrous oily food according to the present aspect has the water-based continuous phase and the oil-based continuous phase, and thus can provide the effect of being capable of preventing the separation of fat without depending on whether the ingredient is inherently an emulsified product or a non-emulsified product (in particular, even when the ingredient is a non-emulsified product). In addition, the hydrous oily food according to the present aspect has excellent melting in the mouth like for example, an oil-in-water emulsified hydrous oily food. Further, since the hydrous oily food according to the present aspect has a good shelf-life and can provide improved heat resistance as compared with those of a typical oil-in-water one, the suitability for distribution and storage can be improved.

In the hydrous oily food having a moisture content of 3% by mass or more and 20% by mass or less, the structure having both the water-based and the oil-based continuous phases is not known. Such a moisture content falls within the moisture range at which uniform mixing and emulsifying have conventionally been difficult, and thus the addition of an emulsifying agent has been considered to be essential. However, the emulsifying agent is not essential for the hydrous oily food according to the present aspect, and the effects of the invention can be exerted without depending on the emulsifying agent (when use of the emulsifying agent is eliminated or reduced). Thus, it is possible to provide a food with suppressed influence derived from the emulsifying agent on the flavor. The hydrous oily food according to the present aspect has good melting in the mouth while having an oil-based continuous phase. In addition, the hydrous oily food according to the present aspect has a high degree of freedom in terms of blending, so that it is possible to obtain a food having a long shelf-life (having good preservability) while having a water-based continuous phase.

In the following, the invention will be described by comparing with the techniques of Patent Documents 1 to 5.

The techniques of Patent Documents 1 and 2 are each according to an oil-in-water emulsified product (a structure mainly composed of a water-based continuous phase), which is considered to have a different structure from that of the invention.

In the technique of Patent Document 3, the moisture content is less than 3% by mass. Accordingly, the technique is not intended to impart excellent melting in the mouth by adjusting the moisture content to 3% by mass or more and 20% by mass or less, and does not solve the separation of fat that is the problem in the case where the moisture content is 3% by mass or more and 20% by mass or less.

Since it is described that the emulsified state deteriorates when the moisture content is within a range of 3% by mass or more and 20% by mass or less, it is considered that the technique of Patent Document 4 is not intended to contain a water-based continuous phase and an oil-based continuous phase like the invention.

Since a cellulose composite is blended with a water-based ingredient in advance and the hydrous chocolate obtained is presumed to be a water-in-oil one, it is considered that the technique of Patent Document 5 is not intended to contain a water-based continuous phase and an oil-based continuous phase like the invention.

The form (type) of the hydrous oily food according to the present aspect is not limited in any way, and can be, for example, hydrous chocolate. The hydrous chocolate can be, but is not limited to, any of "Chocolates" in The Fair Competition Code specified by Federation of Fair Trade Conferences, and may be any product containing a cacao-derived component.

Examples of the cacao-derived component include cacao beans, cacao nib, cacao mass, cocoa butter, cocoa powder, and cocoa cake. Cacao nib is an endosperm part obtained by crushing cacao beans and removing husks and germs. Cacao mass is obtained by triturating cacao nib, Cocoa butter, cocoa powder, and cocoa cake are obtained by processing cacao mass in accordance with a conventional method.

The hydrous oily food is not limited to hydrous chocolate, and for example, can be one obtained by adding a sugar ingredient and fresh cream to almond paste, or one obtained by adding a sugar ingredient and puree to medium chain fatty acid (MCT). In these cases, the separation of fat typically occurs in a range where the moisture content is 3% by mass or more and 20% by mass or less, as in the hydrous chocolate, but it is possible to produce a formed product prevented from the separation of fat by containing the water-based continuous phase and the oil-based continuous phase. The heat-resistant shape retention properties in these cases may be, for example, 10° C. or less, unlike the hydrous chocolate typically containing cocoa butter as the main component.

Whether the hydrous oily food contains a water-based continuous phase and an oil-based continuous phase is determined by the method described below.

With respect to the water-based continuous phase, the hydrous oily food is determined to contain a water-based continuous phase if the hydrous oily food has electrical conductivity, and is determined not to contain a water-based continuous phase if the hydrous oily food does not have electrical conductivity.

With respect to the oil-based continuous phase, the hydrous oily food is determined to contain an oil-based continuous phase if the hydrous oily food satisfies at least one of Condition A and Condition B shown below, and determined not to contain an oil-based continuous phase if the hydrous oily food satisfies neither Condition A nor Condition B shown below.

(Condition A)

When a section of a hydrous oily food is made with a cutter, stained with a staining solution capable of staining fat ("BODIPY®" manufactured by invitrogen), and observed for the state of existence of fat through a confocal laser microscope, the fat is observed in a state in which the outer peripheries of stained parts of the fat are forming a continuous shape like an irregular cloud or network through joining.

For example, a state in which most fat is dispersed as fat droplets is determined not to satisfy Condition A.

(Condition B)

The "area fraction of fat forming a continuous phase" which is described below, is 10% or more.

A section of a hydrous oily food is made with a cutter, stained with a staining solution capable of staining fat ("BODIPY®" manufactured by invitrogen), and observed through a confocal laser microscope to convert the observed image (stained image) into a monochrome image in 16-bit contrast levels. Subsequently, the monochrome image is analyzed by using the image analysis software "ImageJ" (free software, downloadable from the following URL: https-J/imagej.net/Welcome) with selection of the following conditions.

Analysis method: particle analysis

Size: 200 pixel^2

The "area fraction" obtained from the analysis, that is, the fraction of the area of targets having an area of 200 pixel^2 (200×200 pixels) or larger (fat such that adjacent fat droplets are joining together) to the total area of the analyzed image is regarded as the "area fraction of fat forming a continuous phase".

The moisture content of the hydrous oily food may be, for example, less than 20% by mass, 19% by mass or less, 18% by mass or less, 17% by mass or less. 18% by mass or less, 15% by mass or less, 14% by mass or less, 13% by mass or less, 12% by mass or less, 11% by mass or less, 10% by mass or less, 9% by mass or less, or 8% by mass or less, and may be, for example, 4% by mass or more or 5% by mass or more.

The moisture content is a value measured by the method described in Examples.

For example, the fat content of the hydrous oily food is preferably 3% by mass or more and 97% by mass or less, and further preferably 20% by mass or more and 50% by mass or less.

The fat content is a value measured by the method described in Examples.

In an embodiment. 30% by mass or more, 50% by mass or more, 70% by mass or more, 80% by mass or more, 90% by mass or more, and further, 95% by mass or more of the total amount of fat contained in the hydrous oily food derives from a chocolate ingredient.

In an embodiment, the hydrous oily food has a moisture content of 3 to 15% by mass, preferably 5 to 12% by mass, and further preferably 5 to 10% by mass, and a fat content of 3 to 50% by mass, preferably 20 to 50% by mass, and further preferably 30 to 50% by mass.

In an embodiment, the hydrous oily food has a moisture content of 3 to 15% by mass, preferably 5 to 12% by mass, and further preferably 5 to 10% by mass, and has a fat content of 3 to 50% by mass, preferably 3 to 40% by mass, and further preferably 3 to 30% by mass. Here, when the total amount of fat is taken as 100% by mass, it is desirable that the solid fat be blended in an amount of 0% by mass or more, preferably 30% by mass or more, and further preferably 50% by mass or more at 23° C.

In an embodiment, the hydrous oily food is a formed product.

In an embodiment, the hydrous oily food has plasticity.

The "plasticity" as used herein means that the shape is press deformable in an environment at 20° C. and maintainable after the release of the press. The shape after the release of the press is only required to be maintained to an extent that the change is not visually observed. A mixture having such plasticity can be formed into a free shape with fingers. A mixture having such plasticity exhibits an excellent effect on the formability or the like.

In an embodiment, the hydrous oily food has plasticity during storage at ambient temperature (23° C.) and also after storage at ambient temperature for 24 months from immediately after production. Thus, the hydrous oily food is easily formed and processed. In addition, the hydrous oily food can achieve a soft texture even with a high solid content.

In an embodiment, the hydrous oily food retains the water-based continuous phase and the oil-based continuous phase even after storage at a temperature less than the melting point of the mainly contained fat (e.g., ambient temperature (23° C.)) for 1 day, 5 days, 10 days, 1 month, 2 months, 3 months, 6 months, 12 months, or 24 months. One month is taken as 30 days.

In an embodiment, the hydrous oily food has heat-resistant shape retention properties and heat-resistant non-adhesive properties. Hence, distribution at ambient temperature (23° C.) can be preferably applied to the hydrous oily food. Thus, the present embodiment provides a method for distributing the hydrous oily food at ambient temperature.

Any method may be used without limitation for producing the hydrous oily food according to the present aspect.

In an embodiment, the hydrous oily food according to the present aspect may be produced by, for example, mixing an emulsified product (e.g., ganache) under cooling.

In an embodiment, the hydrous oily food according to the present aspect can be produced by, for example, mixing a non-emulsified product under cooling. Here, the non-emulsified product is an ingredient obtained by blending a water-based ingredient and an oil-based ingredient, which is difficult to be uniformly emulsified, mixed and formed because the fat is separated by a typical production method of ganache. Even with such an ingredient, the formation of the water-based continuous phase and the oil-based continuous phase allows the effect of the invention to be achieved and enables uniform mixing and stable formation.

The hydrous oily food obtained by using a non-emulsified product as the ingredient may turn back to a non-emulsified product in which the separation of fat occurs, when being warmed to a temperature zone not less than the melting temperature of the fat contained in the hydrous oily food (e.g., 70° C. to 80° C.) and then stirred. In this case, the state of coexistence of the water-based continuous phase and the oil-based continuous phase may be disrupted.

In contrast, the hydrous oily food obtained by using an emulsified product as the ingredient may be in an emulsified state after being subjected to warming and stirring as described above. However, the state of coexistence of the water-based continuous phase and the oil-based continuous phase may be disrupted. Consequently, the emulsified product after being subjected to warming and stirring as described above is difficult to obtain the effect of the softening of the texture that is obtained in the hydrous oily food of the invention.

The softening of the texture of the hydrous oily food can be evaluated by evaluation by sensory evaluation by specialized panelists or stress measurement. The stress measurement is carried out by the method described in Examples.

In an embodiment, the hydrous oily food according to the present aspect can be produced by mixing the oil-based ingredient and the water-based ingredient under cooling.

In an embodiment, the hydrous oily food according to the present aspect can be produced by mixing the oil-based ingredient and the water-based ingredient in advance, and mixing the mixture obtained under cooling.

The water-based ingredient may be any ingredient containing water without limitation. Examples of the water-based ingredient include water, an aqueous solution, an aqueous dispersion, an extraction liquid (the solvent for extraction may be any of water and hydrophilic solvents such as alcohols, without limitation). Specific examples thereof include fresh cream, bovine milk, condensed milk, juice, sugar solution, alcohol, fragrances, fruit pieces, and fruit puree. Alternatively, the water-based ingredient may be a paste obtained by adding a solid ingredient having a characteristic of dissolving or dispersing in those water-based ingredients to any of the water-based ingredients. Examples of the solid ingredient include saccharides (sucrose, fructose, lactose, sugar alcohols, oligosaccharides, etc.), dairy ingredients (whole milk powder, skimmed milk powder, milk protein, etc.), plant powders (fruit juice powder, vegetable powder, plant extract powder, etc.), cocoa powder, and thickeners (polysaccharide thickeners, gelatin, gummies, etc.).

The oil-based ingredient may be fat or an emulsified product with a continuous phase of oil. Examples thereof include cocoa butter, cacao mass, nut paste, cocoa butter substitute, plant fat, shortening, and various spreads.

Typically, in a mixture of these water-based ingredients and oil-based ingredients, fat is likely to be separated with the moisture content of 3% by mass or more and 20% by mass or less and it is difficult to maintain the emulsified state. However, the formation of the water-based continuous phase and the oil-based continuous phase allows the effect of the invention to be achieved and enables uniform mixing and stable formation.

Any method may be used without limitation for mixing the above-described ingredients under cooling.

In an embodiment, when the water-based ingredient and the oil-based ingredient are mixed (or a mixture obtained by mixing the oil-based ingredient and the water-based ingredient in advance and the mixture obtained is further mixed), the ingredients are cooled to a temperature not more than the melting point (preferably less than the melting point) of the fat as the main ingredient. For example, when cocoa butter is used as the main Ingredient, the ingredients are mixed preferably at 30° C. or less, and more preferably at 28° C. or less under cooling. Within such a temperature range, a mixture (hydrous oily food) with suppressed separation of fat can be prepared.

Any means may be used without limitation for mixing the ingredients under cooling. For example, a mixing means including a cooling means can be preferably used. Examples of the cooling means include jackets. Examples of the mixing means include extruders and mixers. If an extruder is used, operations from cold mixing to extrusion can be consecutively performed. If a mixer is used, a base after cold mixing can be formed in another step.

As described above, the hydrous oily food according to the present aspect may be a mixture of the water-based ingredient and the oil-based ingredient. In other words, the hydrous oily food according to the present aspect may be a mixture containing moisture and fat. In the mixture, the moisture and the fat are mixed with each other. Here, the moisture in the mixture may form the water-based continuous phase and the fat in the mixture may form the oil-based continuous phase. In other words, the fat that forms the oil-based continuous phase and the moisture that forms the water-based continuous phase may be in a state mixed with each other. In the mixture, the water-based continuous phase and the oil-based continuous phase may not be visually distinguishable, and the boundary between the water-based continuous phase and the oil-based continuous phase may not be visually distinguishable.

The hydrous oily food according to the present aspect may be the final product (the form in distribution) only by the hydrous oily food alone, or may be a process food (composite food) which is a combination of the hydrous oily food and other foods. Examples of other foods include cocoa powder, chocolate, white chocolate, cream, sauce, nut (almond, etc.), bread dough, pie dough, biscuit dough, fruit (rum-soaked raisin, etc.), and cheese. Examples of the form of other foods include a coating material that coats at least one of the surface of the hydrous oily food, and a filling that is filled inside the hydrous oily food. The coating material may have, for example, a powder form, a layered form, or the like. The hydrous oily food according to the present aspect may also be used as the above-described coating material or filling for other foods. For example, the hydrous oily food according to the present aspect may be used as a topping for other foods. In an arbitrary composite food composed of a combination of a plurality of foods, at least one food may be the hydrous oily food according to the present aspect.

Unless otherwise stated, physical properties, measurements, and others shown herein are those observed in an environment at 20° C.

EXAMPLES

Hereinafter, the invention will be more specifically described with reference to Examples; however, the scope of the invention is not limited to the description in Examples. In Examples below, "%" indicates "% by mass", unless otherwise stated.

[Measurement Methods]

First, measurement methods will be described for moisture contents and fat contents to be measured in Examples and Comparative Example.

(1) Moisture Content

Measurement was performed in accordance with "5. Carbohydrates, b. Moisture, (3) Vacuum Heat Drying Method" in "Annex: Analysis Methods for Nutritional Components" (https/ww.caa.go.jp/policies/policyftood_labeling/food_labeling_act/pdf/food_labeling_cms101_20 0327_11.pdf) of "Food Labeling Standards (Consumer Affairs Agency Food Labeling Division Notification No. 139 published on Mar. 30, 2015)", a notification relating to food labeling from Consumer Affairs Agency, Government of Japan. The specific method is as follows.

The constant weight ($W_0$ (g)) of a weighing dish (with a lid) whose bottom diameter is 50 mm is determined. Subsequently, 2 g of a sample is collected on the weighing dish, and weighed ($W_1$ (g)). Then, the weighing dish, with the lid slightly displaced, is placed in a vacuum dryer the temperature of which has been adjusted to 100° C., and the degree of vacuum is set to 25 mmHg with suction by a vacuum pump. After drying under reduced pressure for 2 hours, the vacuum pump is stopped, dehumidified air is calmly introduced into the vacuum dryer to return to normal pressure, the weighing dish is taken out and covered with the lid, and the constant weight ($W_2$ (g)) is determined. The moisture content of the sample is determined with the following formula.

$$\text{Moisture content (\% by mass) of sample} = \{(W_1 - W_2)/(W_1 - W_0)\} \times 100$$

9

(2) Fat Content

Measurement was performed in accordance with "2. Lipids, (4) Acid Hydrolysis Method" in "Annex: Analysis Methods for Nutritional Components" mentioned above. The specific method is as follows.

A sample in an appropriate amount (1 to 2 g or less as a dry matter) is collected in a 50-mL beaker, and weighed (W (g)). Subsequently, 2 mL of ethanol (95 v/v %, special grade) is added thereto, and mixed well together with a glass rod. Then, 10 mL of hydrochloric acid (a mixture of concentrated hydrochloric acid (special grade) and ion-exchanged water at a volume ratio of 2:1) is added thereto and sufficiently mixed well together, and the resultant is covered with a watch glass and warmed on an electric thermostatic tank at 70 to 80° C. for 30 to 40 minutes under intermittent stirring. After allowing to cool down, the content is transferred into an extraction tube, the beaker and the glass rod are washed with 10 mL of ethanol and further washed with 25 mL of ether (special grade), and the washings are collected in the extraction tube. The extraction tube is plugged and gently shaken for mixing well together, and the plug is slowly twisted to remove the gas of ether. The extraction tube is plugged again and vigorously shaken for mixing for 30 seconds. Then, 25 mL of petroleum ether is added thereto, and the extraction tube is vigorously shaken for mixing for 30 seconds, similarly. After leaving to stand until the upper layer becomes transparent, filtration is performed with a funnel packed with absorbent cotton. The filtrate is dried in advance with an electric constant-temperature dryer at 100 to 105° C. for 1 hour, then allowed to cool down in a desiccator for 1 hour, and collected in a flask the constant weight ($W_0$ (g)) of which has been measured. To the aqueous layer in the tube, a mixed solution of 20 mL of ether and 20 mL of petroleum ether is added, the same operations as described above are performed, the resultant is then left to stand, and the ether layer is filtered and collected in a flask, similarly. Further, a mixed solution of 15 mL of ether and 15 mL of petroleum ether is added thereto, those operations are repeated once again, the tip of the extraction tube and the tips of the plug and the funnel are sufficiently washed with a mixed solution of equal amounts of ether and petroleum ether, and the washings are also collected. The flask into which the mixed solutions have been collected is connected to a rotary evaporator, warmed in an electric thermostatic tank for solvent distillation at 70 to 80° C. to distill off the solvents, and the residual mixed solution is sufficiently distilled off. The outer face of the flask is wiped with gauze, and the flask is dried in an electric constant-temperature dryer at 100 to 105° C. for 1 hour, then transferred into a desiccator, allowed to cool down for 1 hour, and weighed. The operations of drying, allowing to cool down, and weighing are repeated to determine the constant weight, W1 (g). The lipid content (fat content) of the sample is determined with the following formula.

$$\text{Fat content(g/100 g) of sample} = \{(W_1 - W_0)/W\} \times 100$$

(3) Stress

A sample is formed into a substantially rectangular shape (height: about 7 mm), and the maximum value (Peak) of the stress measured under the following measurement conditions is taken as the "stress".

<Measurement Conditions>

Measurement temperature: 20° C.

Measurement device: "FUDOH rheometer RTC-30100-CW" manufactured by RHEOTECH

Plunger: columnar plunger having a diameter of 3 mm (metal material)

Penetration rate of plunger: 2 cm/minute

Penetration depth of plunger: 3 mm

Example 1

62.0% by mass of a milk chocolate base (consisting of 31.0% by mass of cacao mass, 26.0% by mass of milk powder, 22.0% by mass of cocoa butter. 20.0% by mass of sugar, and 1.0% by mass of an emulsifying agent) and 38.0% by mass of a hydrous paste (obtained by stirring 41.0% by mass of fructose, 23.0% by mass of butter. 32.0% by mass of fresh cream, and 4.0% by mass of brandy with an overmixer whose jacket temperature was controlled to 60° C.) were introduced into a twin-screw extruder, kneaded while being conveyed under cooling under operation conditions shown below so as to give a formed product with suppressed separation, and extruded. The mixture extruded was cut into a square size of substantially 2 cm to obtain a hydrous oily food (hydrous chocolate).

Operation Conditions for Extruder

Ingredient Introduction temperature: 35° C.

Internal temperature of cooling area: 0 to 5° C.

Discharge temperature (surface): 15.0 to 18.0° C.

Here, the "internal temperature of cooling area" is the temperature of the mixture during kneading while being conveyed under cooling described above. The "discharge temperature (surface)" is the surface temperature of the mixture discharged from the outlet of the extruder.

Oil separation did not occur during mixing with the extruder, so that stable dischargement and formation were achieved.

The hydrous chocolate obtained had plasticity, and had a moisture content of 9.7% and a fat content of 42.6%.

Since the hydrous chocolate was verified to have electrical conductivity by a tester ("PM3" manufactured by SANWA ELECTRIC INSTRUMENT CO., LTD.), the formation of the water-based continuous phase was verified.

Further, a section of hydrous chocolate (thickness: approximately 100 μm) was made with a cutter, the section was treated with a 1,2-propanediol solution of a staining solution for fat globules ("BODIPY®" manufactured by Invitrogen), and the state of existence of fat was observed through a confocal laser microscope. FIG. 1 shows the result of observation with the confocal microscope (×40 times). In FIG. 1, the white portion indicates stained fat and the black portion indicates components other than fat. As shown in FIG. 1, almost no separated fat droplet was observed in the observation with the confocal microscope after staining of fat, and it was verified that fat droplets were joined together with adjacent fat droplets to form the oil-based continuous phase.

Hence, it is understood that the hydrous chocolate contains the water-based continuous phase and the fat-based continuous phase. In addition, the hydrous chocolate had good melting in the mouth.

Figure 2:
FIG. 2 is a photograph of the separation of fat due to stirring after warming of Example 1.
Figure 2:
Figure 3:
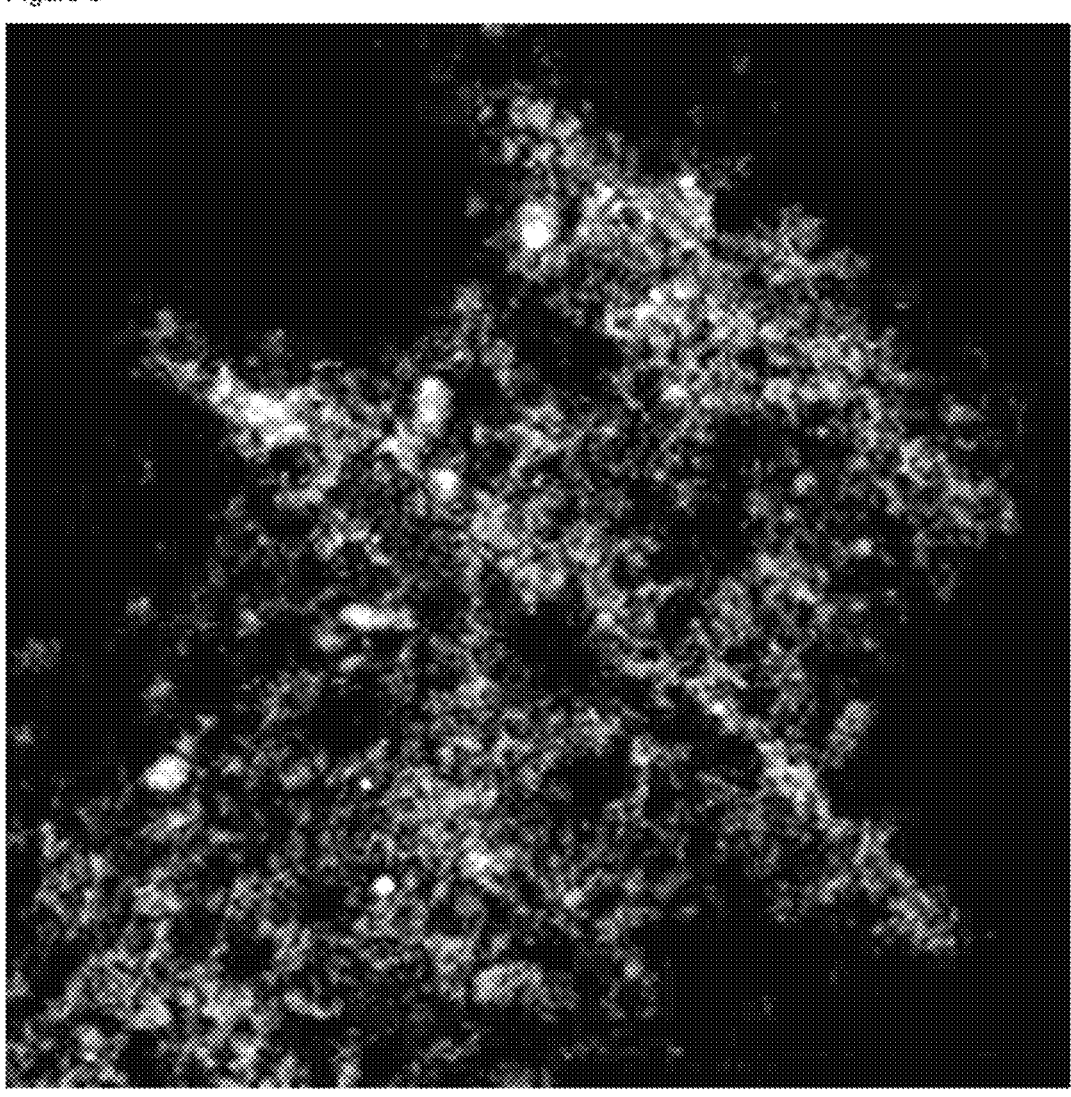
FIG. 3 is a confocal micrograph (×20) of Example 2.

Further, the formed product of the hydrous chocolate was heated at 700 W for 20 seconds to allow the material temperature to be raised to 80° C., followed by stirring. FIG. 2(a) is a photograph showing the state after warming and before stirring, and it is understood that fat oozes from the formed product. FIG. 2(b) is a photograph showing the state after warming and stirring, and separated fat is observed entirely. As shown in FIG. 2, the separation of fat accompanied with the temperature rise could be visually observed. That is, it is understood that the hydrous chocolate is inherently non-emulsified (non-emulsifying properties), but is brought into a stable state (the state where the separation of fat is prevented) the same as emulsification by containing the water-based continuous phase and the oil-based continuous phase.

Example 2

66.7% by mass of a milk chocolate base (consisting of 31% by mass of cacao mass, 23% by mass of sugar, 22% by mass of cocoa butter. 23% by mass of milk powder, and 1% by mass of an emulsifying agent) and 33.3% by mass of Meioligo G (manufactured by Meiji Food Materia Co., LTD., moisture: 24%) were introduced into a twin-screw extruder, kneaded while being conveyed under cooling under operation conditions shown below so as to give a formed product with suppressed separation, and extruded. The mixture extruded was cut into a square size of substantially 2 cm to obtain a hydrous oily food (hydrous chocolate).

Operation Conditions for Extruder
Ingredient introduction temperature: 35° C.
Internal temperature of cooling area: 2 to 7° C.
Discharge temperature (surface): 21.7° C.

The hydrous chocolate obtained had a moisture content of 9.4% and an oil content of 32.3%. The hydrous chocolate maintained shape retainability after storage at 28° C. for 1 month from immediately after production, and could be easily lifted by hand. Further, the hydrous chocolate had plasticity.

After the hydrous chocolate was stored at 23° C. under certain conditions for 24 months from immediately after production, the electrical conductivity thereof was verified by a tester, and as a result, the hydrous chocolate was verified to have electrical conductivity, and the formation of the water-based continuous phase was verified.

As for the hydrous chocolate (after storage for 24 months), the observation with the confocal microscope after staining of fat was carried out in the same manner as in Example 1, and as a result, it was verified that fat droplets were joined together with adjacent fat to form the oil-based continuous phase.

Further, a photograph taken in the above observation with the confocal microscope was analyzed for the state of the oil-based continuous phase by using the image analysis software "ImageJ" (version: 1.53a). Particle analysis was selected as the analysis method, and 200 pixel^2 was selected as the size. "Area fraction" given by the analysis, that is, the fraction of targets having an area of 200 pixel^2 or larger (fat such that adjacent fat droplets were joining together) to the total area of the analyzed image (the area fraction of fat forming a continuous phase) was 10.2%. Since the fraction was 10% or more, the hydrous chocolate was verified to have the oil-based continuous phase.

That is, the hydrous chocolate stably had a structure in which the water-based continuous phase and the oil-based continuous phase coexist even after a lapse of 24 months (720 days) from immediately after production.

The hydrous chocolate had good melting in the mouth in both states of before and after storage.

Example 3

57% by mass of an almond paste, and 43% by mass of a hydrous paste (obtained by stirring 18% by mass of fresh cream, 11% by mass of skimmed milk powder, and 16% by mass of fructose with an overmixer whose jacket temperature was controlled to 60° C.) were introduced into a twin-screw extruder, kneaded while being conveyed under cooling under operation conditions shown below so as to give a formed product with suppressed separation, and extruded. The mixture extruded was cut into a square size of substantially 2 cm to obtain an almond-containing hydrous oily food.

Operation Conditions for Extruder
Ingredient introduction temperature: 30° C.
Internal temperature of cooling area: –5° C.
Discharge temperature (surface): 8° C.

Figure 4:
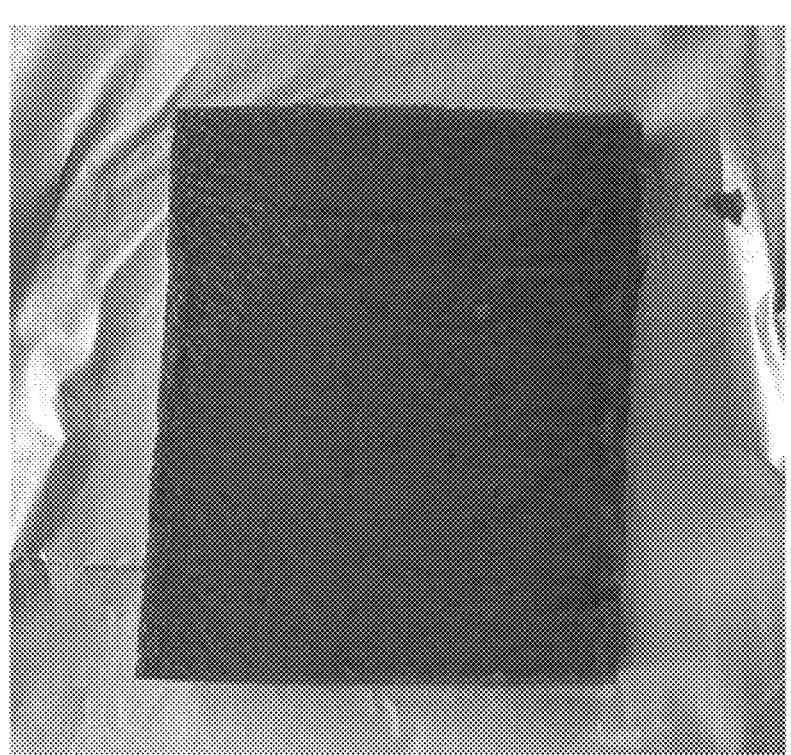
FIG. 4 is a photograph of a product formed by an extruder.

FIG. 4 shows a photograph of the hydrous oily food obtained. The hydrous oily food had a moisture content of 9.3% and a fat content of 39.2%, and had neither heat-resistant shape retention properties nor plasticity at 20° C. In the hydrous oily food, the separation of fat did not occur and uniform mixing and formation were achieved. Further, the hydrous oily food had good melting in the mouth.

Since the hydrous oily food was verified to have electrical conductivity by the tester, the formation of the water-based continuous phase was verified. The observation with the confocal microscope after staining of fat was carried out in the same manner as in Example 1, and as a result, it was verified that fat droplets were joined together with adjacent fat to form the oil-based continuous phase.

When the same Ingredients as those used for the hydrous oily food were mixed at ambient temperature with a hand-mixer without being subjected to an extruder, the separation of fat was observed. That is, it is understood that the hydrous oily food is inherently non-emulsified (non-emulsifying properties), but is brought into a stable state (the state where the separation of fat is prevented) the same as emulsification by formation of the water-based continuous phase and the oil-based continuous phase.

Example 4

A commercially available nama-chocolate was melted, and mixed under cooling under the following extruder conditions so that a formed product with suppressed separation could be obtained to give a hydrous oily food (hydrous chocolate).

Operation Conditions for Extruder
Ingredient introduction temperature: 35° C.
Internal temperature of cooling area: –5 to 0° C.
Discharge temperature (surface): 15.0 to 18.0° C.

The hydrous chocolate obtained had a moisture content of 15.6% and a fat content of 38.3%, and had neither heat-resistant shape retention properties nor plasticity at 20° C.

Figure 5:
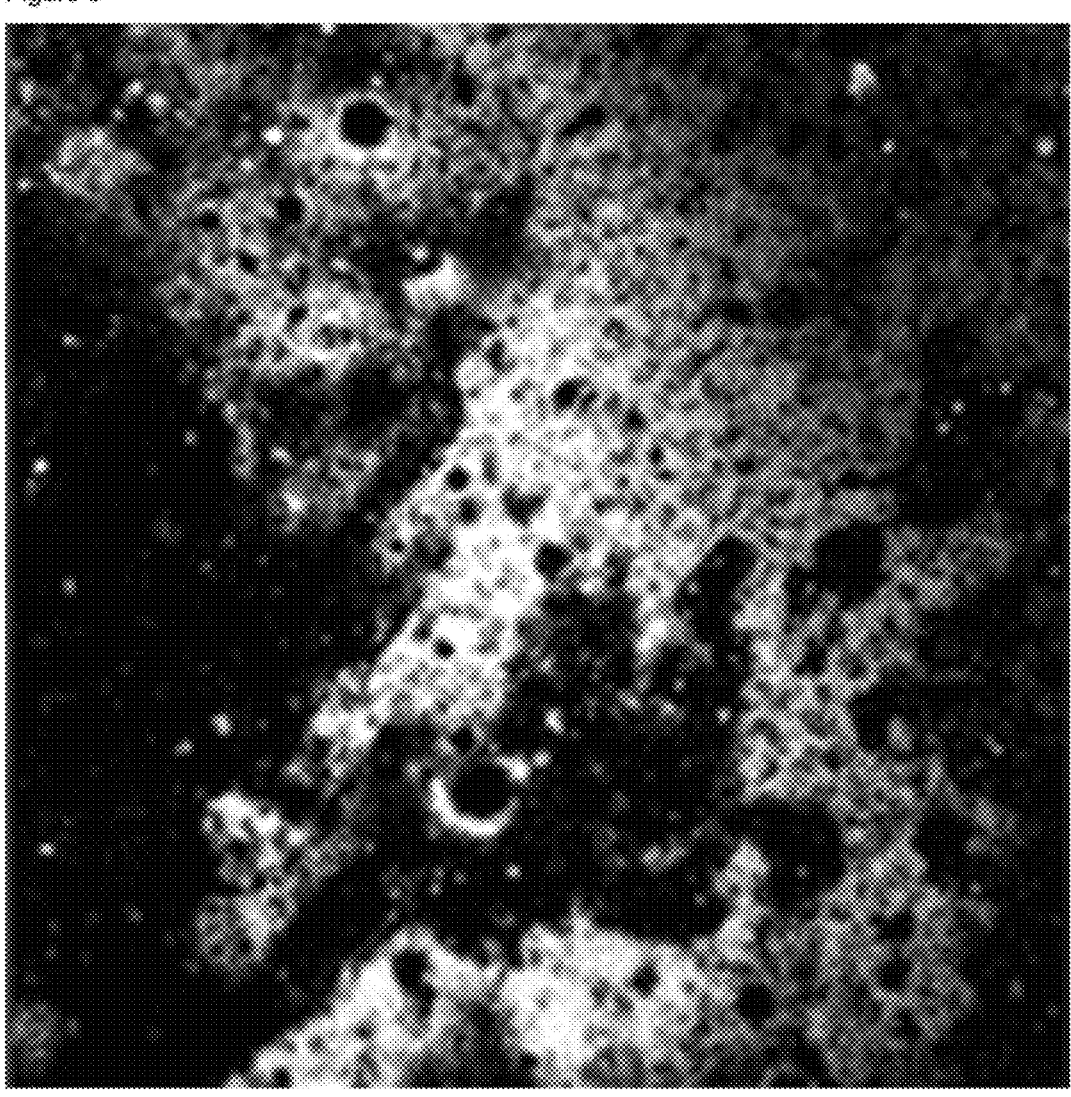
FIG. 5 is a confocal micrograph (×20) of Example 4.

Since the hydrous chocolate was verified to have electrical conductivity by a tester, the formation of the water-based continuous phase was verified. The observation with the confocal microscope after staining of fat was carried out in the same manner as in Example 1, and as a result, it was verified that fat droplets were joined together with adjacent fat droplets to form the oil-based continuous phase, as shown in FIG. 5. That is, the hydrous chocolate treated by an extruder had a structure in which the water-based continuous phase and the oil-based continuous phase coexist. The hydrous chocolate had good melting in the mouth.

As for the hydrous chocolate, the area fraction of fat forming a continuous phase was calculated in the same manner as in Example 2 and found to be 16.9%. Since the fraction was 10% or more, the hydrous chocolate was verified to have the oil-based continuous phase.

On the other hand, since the commercially available nama-chocolate being not subjected to mixing under cooling was verified to have electrical conductivity by a tester, the formation of the water-based continuous phase was verified.

Figure 6:
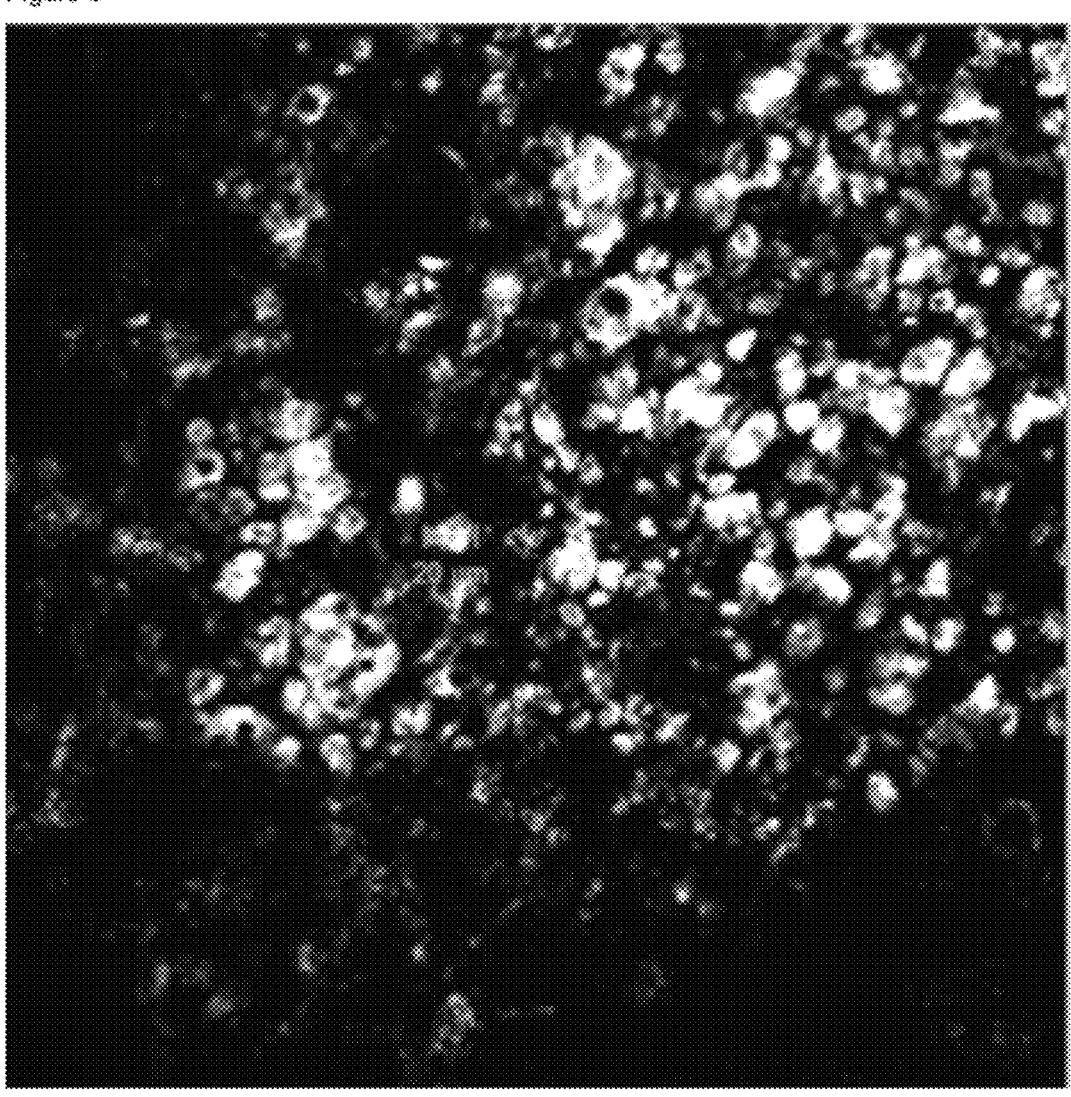
FIG. 6 is a confocal micrograph (×20) of Example 4 (control: a commercially available nama-chocolate (Japanese ganache, a chocolate mixed with fresh cream)).

However, the observation with the confocal microscope after staining of fat was further carried out in the same manner as in Example 1, and as a result, since fat droplets were not joined together and present being dispersed as fat droplets, as shown in FIG. 6, it was verified that the oil-based continuous phase was not formed. In the combination with the results of the electrical conductivity checking, the commercially available nama-chocolate was verified to have a structure mainly composed of the water-based continuous phase.

As for the commercially available nama-chocolate, the area fraction of fat forming a continuous phase was calculated in the same manner as in Example 2 and found to be 7.3%. Since the fraction was less than 10%, the commercially available nama-chocolate was verified to not contain the oil-based continuous phase.

Figure 7:
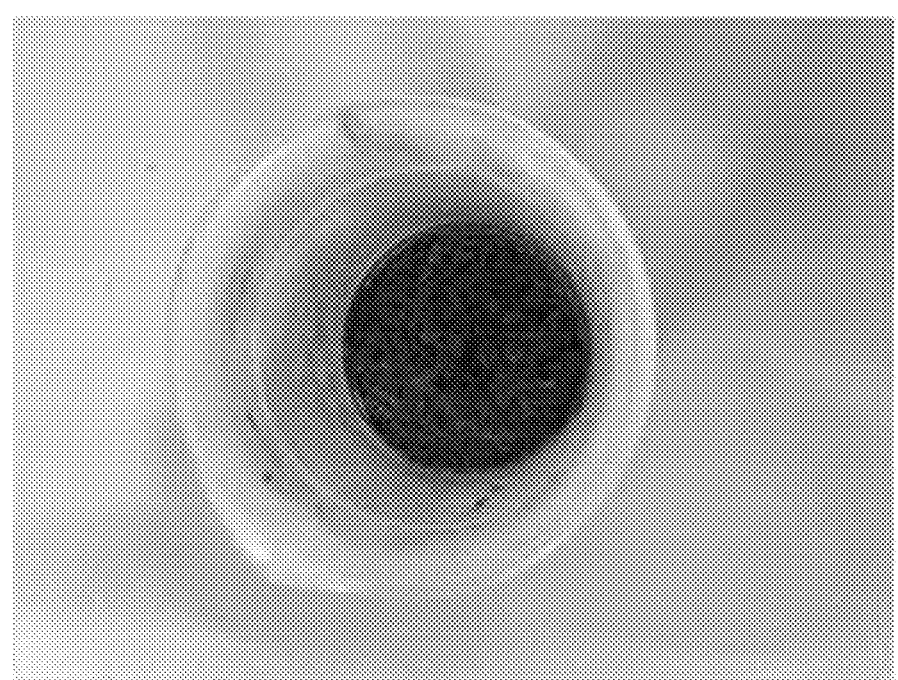
FIG. 7 is a photograph of reemulsification due to stirring after warming of Example 4.
Figure 7:

The commercially available nama-chocolate was warmed to 70° C. and stirred. FIG. 7(*a*) is a photograph showing the state after warming and before stirring, and FIG. 7(*b*) is a photograph showing the state after warming and stirring. As shown in FIG. 7, the separation of fat accompanied with warming did not occur in the commercially available nama-chocolate, and it is understood that the commercially available nama-chocolate has a stable emulsified state. Consequently, the hydrous chocolate treated by an extruder is understood to be in a state difficult from the typical emulsified state in the commercially available nama-chocolate (that is, a state containing the water-based continuous phase and the oil-based continuous phase).

The stresses of the hydrous chocolate treated by an extruder (mixing under cooling) and the commercially available nama-chocolate were measured. Samples of the measurement objects were those immediately after being taken out from a refrigerator at 10° C. (material temperature at 10° C.), those after being stand in a thermostat at 20° C. for 2 hours (material temperature at 20° C.), and those after being stand in a thermostat at 25° C. for 2 hours (material temperature at 25° C.). Table 1 shows the results.

TABLE 1

|  |  | Hydrous chocolate mixed under cooling | Commercially available nama-chocolate |
|---|---|---|---|
| Stress | Material temperature at 10° C. | 0.120 kgf | 0.290 kgf |
|  | Material temperature at 20° C. | 0.025 kgf | 0.075 kgf |
|  | Material temperature at 25° C. | 0.010 kgf | 0.030 kgf |

As shown in Table 1, the hydrous chocolate having the water-based continuous phase and the oil-based continuous phase treated by an extruder had a stress of 50% or less of the stress of the commercially available nama-chocolate having the water-based continuous phase but having no oil-based continuous phase. Consequently, it is understood that the hydrous oily food according to the invention has a soft chewing texture.

Example 5

The commercially available nama-chocolate used in Example 4 was mixed with a kenmixer under cooling while being soaked in ice water (4° C.) so that a formed product with suppressed separation could be obtained, and the solid obtained was extended by a sheet forming machine and then cut into a square size of substantially 2 cm.

The hydrous chocolate obtained had a moisture content of 15.8% and a fat content of 36.3%, and had neither heat-resistant shape retention properties nor plasticity at ambient temperature (20° C.).

Figure 8:
FIG. 8 is a confocal micrograph (×20) of Example 5.

Since the hydrous chocolate was verified to have electrical conductivity by a tester, the formation of the water-based continuous phase was verified. The observation with the confocal microscope after staining of fat was carried out in the same manner as in Example 1, and as a result, it was verified that fat droplets were joined together with adjacent fat to form an oil-based continuous phase, as shown in FIG. 8.

As for the hydrous chocolate, the area fraction of fat forming a continuous phase was calculated in the same manner as in Example 2 and found to be 13.1%. Since the fraction was 10% or more, the hydrous chocolate was verified to have an oil-based continuous phase.

As described above, the hydrous chocolate mixed under cooling had a structure in which the water-based continuous phase and the oil-based continuous phase coexist. The hydrous chocolate had good melting in the mouth.

As for the hydrous chocolate, the stress (material temperature at 10° C.) was measured and found to be 0.083 kgf, so that the hydrous chocolate was found to have a soft chewing texture.

Further, the hydrous chocolate was stored in a thermostat at 55° C. for 24 hours and then stirred, resulting in a stable emulsified state. Thus, it is understood that the water-based continuous phase and the oil-based continuous phase can be formed not only in the case of using the ingredient that is inherently non-emulsified (non-emulsifying properties), but also in the case of using the ingredient that inherently has emulsifying properties.

Examples 8 to 8

Using a chocolate ("black chocolate", Meiji Co., Ltd.), a high-fructose corn syrup (Brix value: 75%), strawberry juice (Brix value: 85%), and water with formulations listed in Table 2, a hydrous oily food (hydrous chocolate) was obtained in the same manner as in Example 1. Table 2 shows the moisture content of the hydrous oily food obtained and the resistance value measured by a tester.

TABLE 2

|  |  | Example 6 | Example 7 | Example 8 |
|---|---|---|---|---|
| Amount blended [% by mass] | Chocolate | 88 | 80 | 80 |
|  | Strawberry juice | 12 | — | — |
|  | High-fructose corn syrup | — | 20 | — |
|  | Water | — | — | 20 |
| Moisture content [% by mass] |  | 4.2 | 6.2 | 19.2 |
| Resistance value [MΩ] |  | 13.1 | 25.2 | 1.5 |

Figure 9:
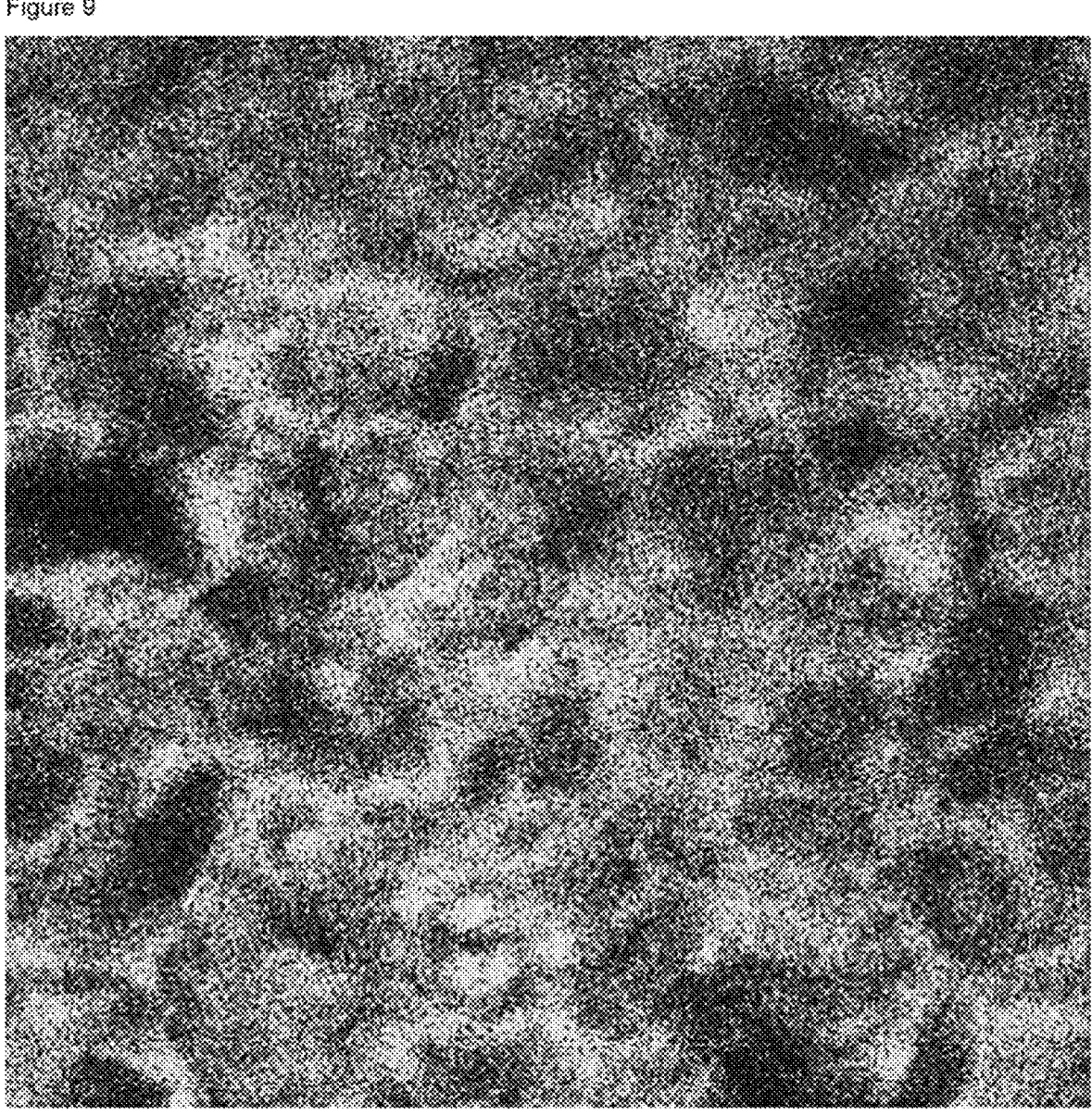
FIG. 9 is a confocal micrograph (×20) of Example 6.
Figure 10:
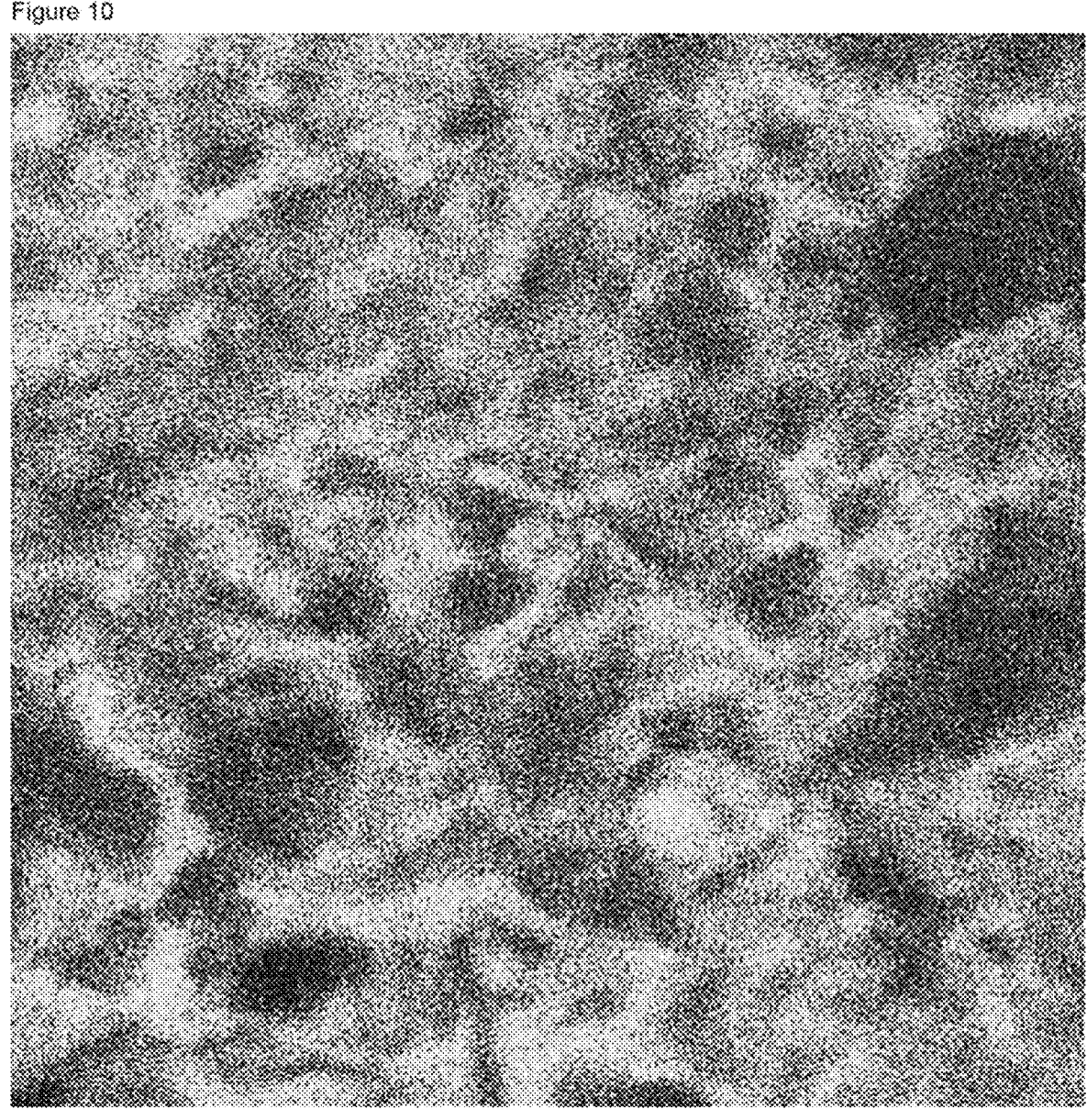
FIG. 10 is a confocal micrograph (×20) of Example 7.
Figure 11:
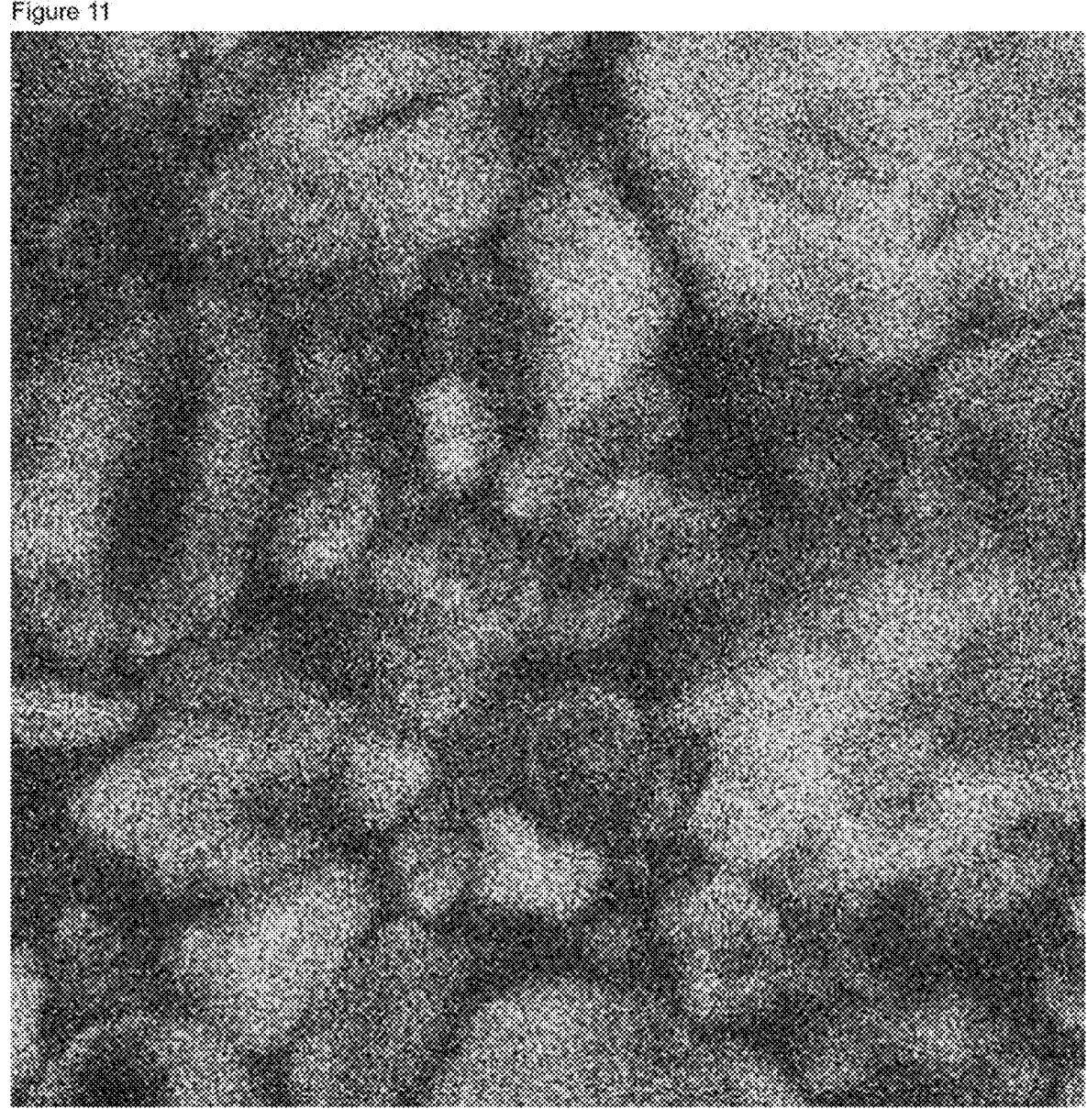
FIG. 11 is a confocal micrograph (×20) of Example 8.

Since the hydrous oily foods of Examples 6 to 8 were verified to have electrical conductivity by the tester, the formation of the water-based continuous phase was verified. The observation with the confocal microscope after staining of fat of the hydrous oily food was carried out in the same manner as in Example 1, and as a result, it was verified that fat droplets were joined together with adjacent fat droplets to form the oil-based continuous phase, as shown in FIG. 9 (Example 6), FIG. 10 (Example 7), and FIG. 11 (Example 8).

Some embodiments and/or Examples of the invention have been described in detail in the above; however, those skilled in the art can readily add numerous modifications to the exemplary embodiments and/or Examples, without substantially departing from the novel teachings and advantageous effects of the invention. Accordingly, such numerous modifications are included in the scope of the invention.

The documents cited herein and the contents of an application on the basis of which the priority of the present application under the Paris Convention is claimed are totally incorporated herein.

The invention claimed is:

1. A hydrous oily food having a moisture content of 3% by mass or more and 20% by mass or less, and comprising a structure in which a water-based continuous phase and an oil-based continuous phase coexist, wherein the existence of the water-based continuous phase is confirmed if the hydrous oily food has electrical conductivity, and the oil-based continuous phase is determined when the hydrous oily food satisfies at least one of the following Conditions A and Condition B;

Condition A: when a section of the hydrous oily food is made with a cutter, stained with a staining solution capable of staining fat, and observed for the state of existence of fat through a confocal laser microscope, the fat is observed in a state in which the outer peripheries of stained parts of the fat are forming a continuous shape like an irregular cloud or network through joining;

Condition B: when a section of the hydrous oily food is made with a cutter, stained with a staining solution capable of staining fat, and observed through a confocal laser microscope to convert the observed image (stained image) into a monochrome image in 16-bit contrast levels; subsequently, the monochrome image is analyzed by using the image analysis software "ImageJ" with selection of the following conditions: analysis method: particle analysis; and size: 200 pixel^2; and the "area fraction" obtained from the analysis, that is, the fraction of the area of targets having an area of 200 pixel^2 (200×200 pixels) or larger (fat such that adjacent fat droplets are joining together) to the total area of the analyzed image is regarded as the "area fraction of fat forming a continuous phase".

2. The hydrous oily food according to claim 1, wherein the water-based continuous phase and the oil-based continuous phase are retained even after storage at 23° C. for 1 day from immediately after production.

3. The hydrous oily food according to claim 1, wherein the hydrous oily food is a hydrous chocolate.

4. The hydrous oily food according to claim 1, which contains no air bubble.

* * * * *